United States Patent
Matsushima et al.

(10) Patent No.: US 10,101,504 B2
(45) Date of Patent: Oct. 16, 2018

(54) OPTICAL ELEMENT AND DISPLAY DEVICE

(71) Applicant: NLT Technologies, Ltd., Kawasaki, Kanagawa (JP)

(72) Inventors: Jin Matsushima, Kanagawa (JP); Koji Shigemura, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 277 days.

(21) Appl. No.: 14/716,164

(22) Filed: May 19, 2015

(65) Prior Publication Data

US 2015/0331154 A1    Nov. 19, 2015

(30) Foreign Application Priority Data

May 19, 2014   (JP) ................. 2014-103820

(51) Int. Cl.
*G02B 3/00*      (2006.01)
*B29D 11/00*     (2006.01)

(52) U.S. Cl.
CPC ........ *G02B 3/005* (2013.01); *B29D 11/00278* (2013.01); *G02B 3/0031* (2013.01); *Y10T 428/24612* (2015.01)

(58) Field of Classification Search
CPC .... G02B 3/005; G02B 3/0068; G02B 3/0031; G02B 27/2214; B29D 11/00278; Y10T 428/24612; Y10T 428/24479; B32B 3/00; B32B 3/28; B32B 3/30
USPC ............... 359/455, 457; 428/156, 172, 167; 362/335, 337, 339, 347, 348
See application file for complete search history.

(56) References Cited

U.S. PATENT DOCUMENTS

| | | | |
|---|---|---|---|
| 2005/0044115 A1 | 2/2005 | Iwakawa et al. | |
| 2006/0210770 A1* | 9/2006 | Nelson | B29C 59/046 428/156 |
| 2007/0242479 A1 | 10/2007 | Ohta et al. | |
| 2008/0014410 A1* | 1/2008 | Johnston | B29C 33/62 428/141 |
| 2010/0195020 A1 | 8/2010 | Goto et al. | |
| 2011/0211261 A1 | 9/2011 | Fukuta | |
| 2012/0057100 A1 | 3/2012 | Masuda et al. | |
| 2015/0085496 A1 | 3/2015 | Okuno | |

FOREIGN PATENT DOCUMENTS

| | | |
|---|---|---|
| CN | 1577071 A | 2/2005 |
| CN | 101055324 A | 10/2007 |
| CN | 101069127 A | 11/2007 |

(Continued)

OTHER PUBLICATIONS

Communication dated Jul. 18, 2017, issued by the State Intellectual Property Office of People's Republic of China in counterpart application No. 201510257730.4.

(Continued)

*Primary Examiner* — Catherine A. Simone
(74) *Attorney, Agent, or Firm* — Sughrue Mion, PLLC

(57) ABSTRACT

An optical element includes a substrate and a resin and satisfies the following formula, RTmax/RTmin≤9/5, wherein RTmin represents the resin thickness at the thinnest regions of a major patterned component that is made of the resin, and RTmax represents the resin thickness at the thickest regions of the major patterned component which is made of the resin.

15 Claims, 12 Drawing Sheets

(56) References Cited

FOREIGN PATENT DOCUMENTS

| | | |
|---|---|---|
| JP | 4-19113 A | 1/1992 |
| JP | 08318674 A | 12/1996 |
| JP | 10289482 A | 10/1998 |
| JP | 2010164657 A | 7/2010 |
| JP | 2010266829 A | 11/2010 |
| JP | 2012008581 A | 1/2012 |
| WO | 2009022725 A1 | 2/2009 |
| WO | 2013080794 A1 | 6/2013 |

OTHER PUBLICATIONS

Communication dated Jan. 9, 2018 from the Japanese Patent Office in counterpart Japanese application No. 2014-103820.

* cited by examiner

10

OPTICAL ELEMENT AND DISPLAY DEVICE

TECHNICAL FIELD

The present invention relates to an optical element and a display device, and in particular, an optical element and a display device that solve problems of substrate warpage and reliability.

DESCRIPTION OF THE RELATED ART

Display panels that are based on a glass substrate and that have multiple pixels, such as liquid crystal display panels, organic EL (electroluminescent) display panels, and PDP (plasma display panels), and stereoscopic display devices that use a lenticular lens sheet have been proposed. Conventionally, lenticular lens sheets that are made of a resin, which is cost effective, have been used. However, the thermal expansion coefficient of a resin differs from the thermal expansion coefficient of glass by a factor of at least 10, and thus, use of a resin lens sheet may cause the problem that as the temperature of a display device rises, the device cannot achieve desired pixels on the glass substrate, a desired pitch of the lens sheet, and a desired positional relationship and cannot provide viewers 3D images.

A lenticular lens sheet that is produced by patterning a resin on one surface of a glass substrate can exhibit a thermal expansion as low as the thermal expansion exhibited by a glass substrate.

Patent Document 1 discloses a method for producing a lens sheet, the method including injecting a UV curable liquid resin between a transparent substrate and a lens mold and irradiating the resin with UV rays to form a lens array on at least one surface of the transparent substrate, wherein, as illustrated in FIG. 1, a protrusion 55 that extends a uniform distance of from 50 μm to 800 μm from the surface of the lens mold is disposed at least opposing parts of the periphery of a lens mold 53, and wherein the UV curable liquid resin is injected between the lens mold and the transparent substrate to cure the resin. The method described in Patent Document 1 can prevent formation of a space between the molded lens array and the lens mold due to the thinness of the resin or cracking of the molded lens array due to the thickness of the resin, when the UV curable resin is cured.

RELATED ART DOCUMENT

Patent Document

Patent Document 1: Japanese Unexamined Patent Application Publication No. H04-19113, Claims at P. 63 and Examples at P. 66

SUMMARY OF THE INVENTION

Problems to be Solved by the Invention

Conventional lenticular lens sheets produced by patterning a UV curable resin on one surface of a glass substrate have two major problems as described below. The first problem is with respect to dimensional stability in assessing the reliability of the lens array made of a UV curable resin. The second problem is that stress generated by the difference in mechanical properties of the glass substrate and the UV curable resin causes warpage of the glass substrate, which has a significant influence in production and use of a display device. As used herein, the mechanical properties include, for example, a coefficient of linear expansion, a Young's modulus, a curing shrinkage ratio.

The problems described above will be specifically described. As illustrated in FIG. 2, a lenticular lens sheet 50, which is an optical component, is produced by patterning a UV curable resin 52 on one surface of a substrate 51. With regard to the UV curable resin 52 that constitutes a lens 54, which is a major pattern of the lenticular lens sheet 50, a resin thickness at the thinnest regions and a resin thickness at the thickest regions are respectively designated as RTmin and RTmax. And the thickness of the substrate 51 is designated as T. In the case of a convex lenticular lens sheet, the thinnest regions are those in which adjacent lenticular lenses meet (lens valleys 59), and the thickest regions are lens peaks 58. For example, in a case in which a resin A is used to produce a lenticular lens sheet that has an RTmax of 200 μm, an RTmin of 100 μm, and a T of 300 μm, the lenticular lens sheet meets the RTmin requirement in Patent Document 1, which is from 50 μm to 800 μm, while in a light fastness test, the radius of curvature of the lens array changes by more than 10%, and the focal length exceeds a predetermined range, thereby reducing the ability to separate light rays and thus making it difficult to provide 3D images. The light fastness test is assessment by light irradiation using a xenon arc lamp. The light fastness test is an accelerated test that simulates a use environment in which a lenticular lens sheet is exposed to direct sunlight.

For example, in a case in which a resin B is used to produce a lenticular lens sheet that has an RTmax of 200 μm, an RTmin of 100 μm, and a T of 300 μm, the lenticular lens sheet meets the RTmin requirement in Patent Document 1, which is from 50 μm to 800 μm, while the sheet warps when the lens array is being produced, which makes it impossible to attach the sheet to a display device. Curing shrinkage during molding causes warpage due to the difference in mechanical properties of the photocurable resin and the glass substrate. When the lenticular lens sheet 50 of FIG. 2 is positioned with the UV curable resin 52 up and the substrate 51 down, the lenticular lens sheet 50 has a downward convex warpage. When the lenticular lens sheet 50 is placed with the glass substrate down, on a stage of a device for attaching the lens sheet to a display device, the stage has a small contact surface with the substrate 50, because the lenticular lens sheet 50 has a downward convex warpage. Thus the lenticular lens sheet 50 is rotated on the stage with a small force, and is more difficult to handle, compared with a lenticular lens sheet 50 that has a smaller warpage. The alignment marks cannot be aligned due to the warpage, and thus the lenticular lens sheet 50 is difficult to align with and attach to a display device. In a case in which the lenticular lens sheet 50 has a large warpage, the lens sheet 50 spontaneously peels off of the display device, some time after the attachment.

A similar problem is presented in a thermal cycle test, which is another reliability test. In a case in which a resin B is used to produce a lenticular lens 50, which is then attached to a device, a lenticular lens sheet 50 peels off in the thermal cycle test. The thermal cycle test is performed by alternating cycles of short-term exposure to high temperature and short-term exposure to low temperature. In the reliability test, there is a tendency for the lens sheet to peel off, because of, for example, stress applied to the attachment surface, the stress being resulting from differences in the thermal expansion coefficients.

An object of the present invention is to solve the problems described above and to improve the reliability and the productivity of an optical element by providing an optical element according to the present invention.

Means of Solving the Problems

An optical element according to one aspect of the present invention includes a substrate and a resin and satisfies the following formula:

$$RT\max/RT\min \leq 9/5 \qquad \text{Formula (1)}$$

In the formula, RTmin represents the resin thickness at the thinnest regions of a major patterned component that is made of the resin, and RTmax represents the resin thickness at the thickest regions of the major patterned component that is made of the resin.

First, certain terms used herein will be defined. As illustrated in FIG. 3, a lens array 56 refers to arrangement of lenses (curved pieces) of the lenticular lens sheet 50 (the region of a resin 64, enclosed by the dashed line in FIG. 3). The lens array 56 ranges from lens peaks 58 to lens valleys 59. As illustrated in FIG. 4, a base 57 refers to a region that has no lenses (curved pieces) of the lenticular lens sheet 50 (the region of the resin 64, enclosed by the dashed line in FIG. 4). The base 57 ranges from the top surface of a substrate 51 to the lens valleys. The major patterned component refers to a pattern that is required to form the optical element and that would significantly deform in a light fastness test and would cause a problem for the optical element. In a lenticular lens sheet, the major patterned component is a lens array.

In order to simplify the illustration, a case in which the resin is a photocurable resin will be described. In an optical element that includes a substrate and a photocurable resin, the relationship between RTmin and RTmax has an influence on curvature change in a light fastness test. The present inventors have found that an optical element that has an RTmin that is smaller than the RTmax and that does not satisfy Formula (1) exhibits a phenomenon illustrated in FIG. 5 in a light fastness test. In the light fastness test, the lenticular lens sheet is irradiated with light 61 from the side of a photocurable resin 60. As the light fastness test progresses, the cure of the photocurable resin that constitutes the lens array 56 is advanced, and the density of the photocurable resin that constitutes the lens array 56 increases from a moderate level to a high level. In this condition, the volume of the lens array 56 decreases. On the other hand, the density of the photocurable resin that constitutes the base 57 decreases from a moderate level to a low level in order to maintain the volume of the photocurable resin, and thus the volume of the base 57 increases to compensate for the decrease in volume of the lens array 56. Before the light fastness test, the volume of the base 57 is not sufficient large relative to the volume of the lens array 56, and thus the volume of the lens array 56 decreases at the end. As a result, the resin thickness at the lens peaks decreases, and the radius of curvature of the lenses changes over 10%.

In a case in which an optical element has an RTmin that is larger than the RTmax and satisfies Formula (1), the optical element exhibits a phenomenon illustrated in FIG. 6 in a light fastness test. A lens array 56 and a base 57 change in a similar manner as in FIG. 5. However, the volume of the base 57 is sufficiently larger than the volume of the lens array 56 before the light fastness test, and thus, diminution in the volume of the lens array 56 can be prevented. This can prevent the radius of curvature of the lenses from changing by more than 10%. In other words, this can prevent deformation of the pattern formed by a photocurable resin.

Although a photocurable resin is used in FIGS. 5 and 6 in order to simplify the illustration, any resins other than photocurable resins can be used in the present invention, as long as the resins include a component that can be cured with light.

An optical element according to another aspect of the present invention includes a substrate and a resin and satisfies the following formula:

$$RT\max/RT\min \leq 5/3 \qquad \text{Formula (2)}$$

In the formula, RTmin represents the resin thickness at the thinnest regions of a major patterned component that is made of the resin, and RTmax represents the resin thickness at the thickest regions of the major patterned component that is made of the resin.

In the optical element illustrated in FIG. 6, the ratio of the volume of the base 57 is further increased, compared with the optical element that satisfies Formula (1), and thus diminution in the volume of the lens array 56 after a light fastness test can be further prevented. This can prevent the radius of curvature of the lenses from changing by more than 5.5%. In other words, this can further prevent deformation of the pattern formed by a photocurable resin.

An optical element according to still another aspect of the present invention includes a substrate and a resin and satisfies the following formula:

$$\sigma/Es \times RT\max/T < 13.0 \text{ ppm} \qquad \text{Formula (3a)}$$

In the formula, $\sigma$ represents the internal stress of the resin, Es represents the Young's modulus of the substrate, and T represents the thickness of the substrate.

Decrease in the ratio of the internal stress of the resin ($\sigma$) after assessing the initial reliability to the Young's modulus of the substrate can prevent warpage of the optical element in production and use of a display device. Additionally, use of a low elastic modulus resin to reduce the internal stress of the resin after assessing the reliability allows the density of the resin to be readily changed in a light fastness test, which can further prevent deformation of the pattern formed by the resin after the light fastness test.

The following Formula (3b) may be employed as an alternative to Formula (3a).

$$\sigma/Es \times RT\max/T \leq 3.0 \text{ ppm} \qquad \text{Formula (3b)}$$

Formula (3b) is more preferred, and warpage of the optical element can be prevented in production and use of a display device. And use of a low elastic modulus resin can further prevent deformation of the pattern formed by the resin after the light fastness test.

In the optical element of the invention, the substrate is a glass substrate that has a thickness of 200 μm or more.

Use of a glass substrate as the substrate can reduce the thermal expansion of the resin on the substrate as low as the thermal expansion of the glass substrate. Additionary the substrate has a thickness of 200 μm or more, the substrate can be cut with a glass scriber with a roll cutter, which is a low-cost cutting method.

In the optical element of the invention, the resin has pencil hardness of 6B or softer.

Generally, resins that have a higher hardness have a higher elastic modulus. In particular, resins that have pencil hardness of 6B or softer have a lower elastic modulus. In the present invention, use of a resin that has a low elastic modulus can reduce warpage of the lens sheet after a constant temperature test and a constant temperature and humidity test and can reduce a change in the radius of curvature in a light fastness test.

An optical element according to still another aspect of the present invention includes a substrate and two or more resin laminate layers. The resin laminate layers include a stress-release resin layer and a patterned resin layer. The stress-release resin layer is disposed between the patterned resin layer and the substrate. The patterned resin layer forms a major patterned component. And the optical element satisfies the following formula:

$$RT\text{max}1/RTrx \leq 9/5 \qquad \text{Formula (7)}$$

In the formula, RTrx represents the resin thickness of the stress-release resin layer, and RTmax1 represents the resin thickness at the thickest regions of the resin laminate layers.

In the optical element that includes a substrate and two or more resin laminate layers, the RTrx and the RTmax1 have an influence on warpage of the optical element in the initial state and after a constant temperature test and a constant temperature and humidity test. If the RTrx is smaller than the RTmax1, and the optical element does not satisfy Formula (7), warpage of the optical element cannot be prevented, which significantly affects production and use of a display device.

As illustrated in FIG. 15, a lenticular lens sheet 18 includes, in order, a substrate 51, a stress-release resin layer 62, and a patterned resin layer 63. The patterned resin layer 63 forms lenses (curved pieces). Curing shrinkage and thermal expansion of the patterned resin layer 63 would cause warpage of the substrate 51 due to stress generated by the difference in mechanical properties of the substrate 51 and the resin. The relationship between the patterned resin layer 63 and the stress-release layer 62 is similar to the relationship between the lens array 56 and the base 57 illustrated in FIGS. 5 and 6. The stress-release resin layer 62 accommodates a change in the volume of the patterned resin layer 63 to prevent warpage of the substrate 51. More specifically, when the patterned resin layer 63 shrinks, the stress-release resin layer 62, which is made of a soft resin, swells to compensate for the shrinkage of the patterned resin layer 63, thereby preventing warpage of the substrate 51. When the patterned resin layer 63 swells, the stress-release resin layer 62 shrinks to prevent warpage of the substrate 51. However, in a case in which an optical element does not satisfy Formula (7), the volume of the stress-release resin layer 62 does not change sufficiently to accommodate a change in the volume of the patterned resin layer 63, which causes warpage of the substrate 51.

In a case in which an optical element satisfies Formula (7), the volume of the stress-release resin layer 62 can change sufficiently to accommodate a change in the volume of the patterned resin layer 63, even after assessing the initial reliability of the optical element, to prevent warpage of the substrate 51, i.e., the optical element. Thus, inclusion of a stress-release resin layer that has a thickness such that the resultant optical element satisfies Formula (7) allows use of a resin that exhibits large warpage after assessing the initial reliability and that could not be used alone.

In an optical element that satisfies the following formula:

$$RT\text{max}1/RTrx \leq 5/3 \qquad \text{Formula (8),}$$

the ratio of the volume of the stress-release resin layer 62 to the volume of the patterned resin layer 63 is larger compared with an optical element that satisfies Formula (7), and thus the stress-release resin layer 62 can more readily accommodate a change in the volume of the patterned resin layer 63, which can further prevent warpage of the optical element.

An optical element according to still another aspect of the present invention includes a substrate and two or more resin laminate layers and satisfies the following formula:

$$\sigma1/Es \times RT\text{max}1/T < 13.0 \text{ ppm} \qquad \text{Formula (9)}$$

In the formula, σ1 represents the internal stress of the resin laminated layers, Es represents the Young's modulus of the substrate, and T represents the thickness of the substrate.

Decrease in the ratio of the internal stress of the resin laminate layers (σ1) to the Young's modulus of the substrate after assessing the initial reliability can prevent warpage of the optical element in production and use of a display device. Additionally, use of a low elastic modulus resin especially for the stress-release resin layer to reduce the internal stress of the resin after assessing the reliability allows the stress-release resin layer to readily accommodate a change in the volume of the patterned resin layer, which can further prevent warpage of the optical element.

More preferably, in an optical element that satisfies the following formula:

$$\sigma1/Es \times RT\text{max}1/T \leq 3.0 \text{ ppm} \qquad \text{Formula (10)}$$

use of a lower modulus resin can further prevent warpage of the optical element in production and use of a display device, compared with an optical element that satisfies Formula (9).

Effects of the Invention

The first effect is prevention of deformation of a patterned resin of an optical element that includes a substrate and a resin, after a light fastness test.

The effect is achieved because the patterned resin has a thickness at the thinnest regions that is sufficiently smaller than a thickness at the thickest regions such that an increase in the volume due to a decrease in the density of the base from a moderate level to a low level can compensate for a decrease in the volume due to an increase in the density of the patterned resin from a moderate level to a high level in a light fastness test.

The second effect is prevention of warpage of an optical element in production and use of a display device, the optical element including a substrate and a resin. Deformation of a pattern made of a resin after a light fastness test can also be prevented.

The effect is achieved by decreasing the ratio of the internal stress of the resin (σ) to the Young's modulus of the substrate to prevent warpage of the optical element, the warpage being caused by the internal stress of the resin. Use of a low modulus resin to reduce the internal stress of the resin after assessing the reliability allows the density of the resin to be readily changed in a light fastness test, which can further prevent deformation of the patterned resin after a light fastness test.

The third effect is prevention of warpage of the optical element in production and use of a display device, the optical element including a substrate and two or more resin laminate layers.

The effect is achieved by providing a stress-release resin layer that has a thickness that is sufficiently larger than the thickness of a patterned resin layer such that a change in volume of the stress-release resin layer can compensate for a change in the volume of the patterned resin layer due to curing shrinkage and thermal expansion that would cause warpage of the optical element.

DESCRIPTION OF THE EMBODIMENTS

First Embodiment

Now, embodiments of the present invention will be described in detail with reference to the drawings.

Figure 7:
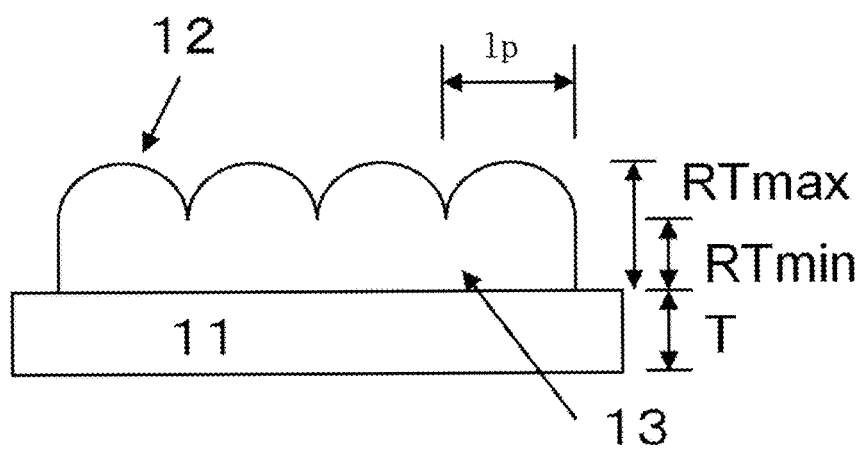
FIG. 7 is a cross-sectional view of a lenticular lens sheet according to the first embodiment of the present invention.
Figure 8:
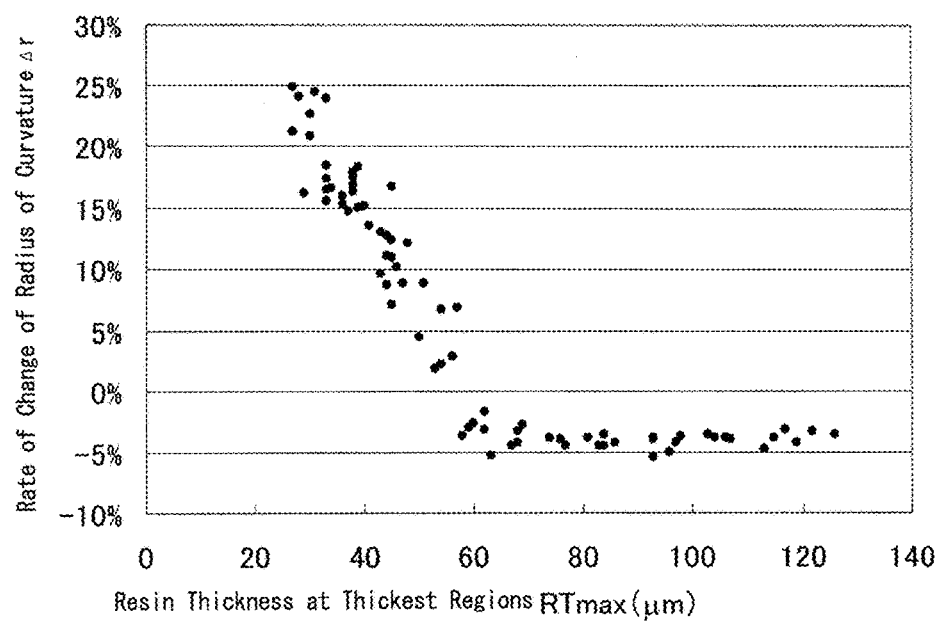
FIG. 8 is a graph illustrating a relationship between a resin thickness at the thickest regions (RTmax) and the rate of change of the radius of curvature ($\Delta r$) of a lenticular lens sheet that includes a resin A after a light fastness test. (RTmax−RTmin is maintained at a constant value of about 21 μm.)
Figure 9:
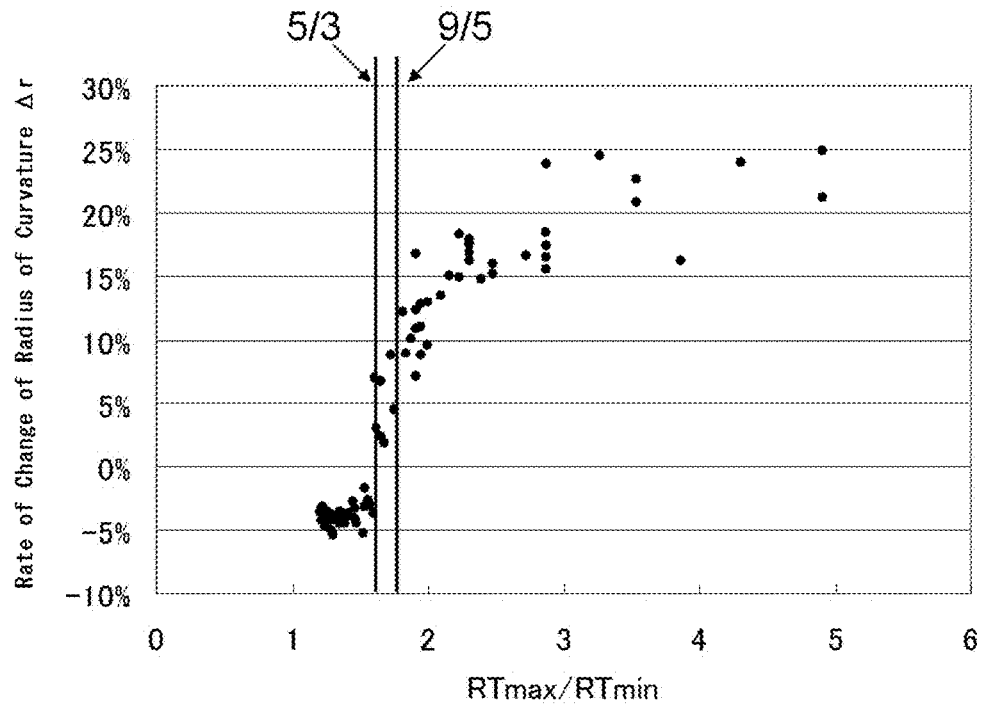
FIG. 9 is a graph illustrating a relationship between RTmax/RTmin and the rate of change of the radius of curvature ($\Delta r$) of a lenticular lens sheet that includes a resin A after a light fastness test. (RTmax−RTmin is maintained at a constant value of about 21 μm.)
Figure 10:
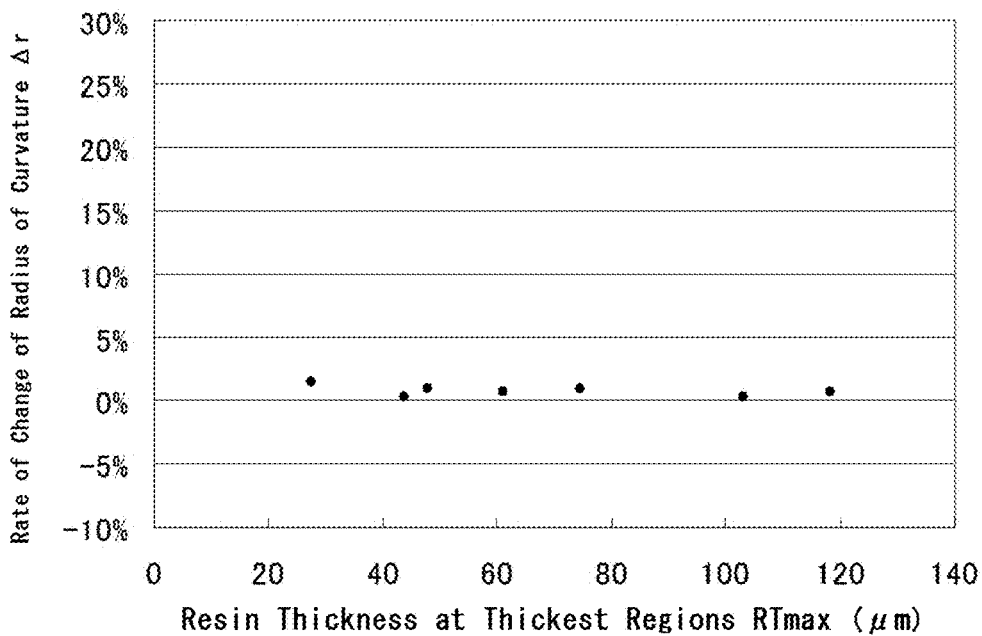
FIG. 10 is a graph illustrating a relationship between a resin thickness at the thickest regions (RTmax) and the rate of change of the radius of curvature ($\Delta r$) of a lenticular lens sheet that includes a resin B after a light fastness test. (RTmax−RTmin is maintained at a constant value of about 21 μm.)

FIG. 7 is a cross-sectional view of a lenticular lens sheet according to the first embodiment. FIG. 8 is a graph illustrating a relationship between a resin thickness at the thickest regions (RTmax) and the rate of change of the radius of curvature ($\Delta r$) of the lenticular lens sheet that includes a resin A after a light fastness test. FIG. 9 is a graph illustrating a relationship between RTmax/RTmin and the rate of change of the radius of curvature ($\Delta r$) of the lenticular lens sheet that includes a resin A after a light fastness test. FIG. 10 is a graph illustrating a relationship between a resin thickness at the thickest regions (RTmax) and the rate of change of the radius of curvature ($\Delta r$) of the lenticular lens sheet that includes a resin B after a light fastness test. In the graphs of FIGS. 9 and 10, RTmax−RTmin is maintained at about 21 μm.

As illustrated in FIG. 7, a lenticular lens sheet 10 according to the first embodiment includes a lens 12 that is made of a UV curable resin 13 and that is formed on a generally planar surface of a glass substrate 11. The lenticular lens according to the present invention can be produced by the following method. The UV curable resin 13 is applied in an appropriate amount onto the glass substrate 11. A lens mold is used to transfer its pattern to the applied UV curable resin 13. The UV curable resin 13 is cured by irradiation with UV light. Then, the lens mold is removed. The major pattern of the lenticular lens is the lens 12. The lens pitch is designated as lp.

The inventors used the lenticular lens sheet 10 to find a method for improving the reliability of the UV curable resin, especially, for preventing a change in the radius of curvature in a light fastness test, which is one of the conventional problems. To assess the reliability, a light fastness test was performed by using a resin A, which was a UV curable resin, fixing the curved shape of the lens 12, and varying RTmax (thus also varying RTmin). The distance from the lens valleys to the lens peaks (RTmax−RTmin) was about 21 μm. The glass substrate 11 had a thickness of from 100 μm to 300 μm. The lens pitch of the lens 12 was in the range of from 100 μm to 500 μm. Before a light fastness test, the radius of curvature rI and the resin thickness at the thickest regions (RTmax) were measured. After the light fastness test, the radius of curvature rA was measured.

The results of the assessment is illustrated in FIG. 8 as a graph illustrating a relationship between the resin thickness at the thickest regions (RTmax) and the rate of change of the radius of curvature ($\Delta r$). $\Delta r$ is (rA−rI)/rI. FIG. 8 shows a very high correlation between RTmax and $\Delta r$ with regard to the resin A. Maintenance of RTmax at 58 μm or more allows maintenance of $\Delta r$ within the range of from +5.5% to −5.5%.

To generalize the result illustrated in FIG. 8, a graph illustrating a relationship between RTmax/RTmin and the rate of change of the radius of curvature ($\Delta r$) is illustrated in FIG. 9. FIG. 9 shows that when RTmax/RTmin is equal to or less than 9/5, the lens sheet that includes a resin A can maintain $\Delta r$ within the range of from +10% to −10% after assessing the light fastness. Additionally, when RTmax/RTmin is equal to or less than 5/3, the lens sheet that includes a resin A can maintain $\Delta r$ within the range of from +5.5% to −5.5%. The assessment was performed under the condition of RTmax<T.

In the first embodiment, only $\Delta r$ is described, although no problems are detected with regard to other properties such as the transmittance and the appearance in the light fastness test.

A light fastness test was also performed by using a resin B, which was a UV curable resin different from the resin A, in a similar manner to the test performed for the resin A. The results are illustrated in FIG. 10, as in FIG. 8. FIG. 10 illustrates that the resin B did not substantially exhibit a change in $\Delta r$ after the light fastness test, regardless of RTmax. No problems were also detected with regard to other properties such as the transmittance and the appearance after the light fastness test. With regard to light fastness, the resin B had acceptable properties. Although other UV curable resins mostly became yellow in the light fastness test, the resin A and the resin B did not substantially exhibit a change in visible light transmittance and did not substantially become colored.

As used herein, the term "A type" refers to a resin that has a rate of change of the radius of curvature ($\Delta r$) after a light fastness test, the rate $\Delta r$ increasing as the resin thickness at the thickest regions (RTmax) decreases after a light fastness test, as illustrated by the graph of FIG. 8. The term "B type" refers to a resin that has a rate of change of the radius of curvature ($\Delta r$) after a light fastness test, the rate $\Delta r$ remaining substantially constant even as the resin thickness at the thickest regions (RTmax) changes after a light fastness test, as illustrated by the graph of FIG. 10. The radius of curvature of an A type changes in a light fastness test, and thus the resin is curing during the test. The radius of curvature of a B type does not change regardless of the resin thickness at the thickest regions in a light fastness test, and thus the resin is not being curing during the test.

However, a lenticular lens sheet 10 that includes a resin B suffers from the problem of large warpage in production and use of a display device. The amount of the warpage depends on the thickness of the glass substrate 11 (T) and the thickness of the UV curable resin. Thus, in order to compare the potential of UV curable resins to exhibit warpage, σ/Es×RTmax/T is calculated from the amount of warpage δ of the lens array. σ refers to the internal stress of the UV curable resin 13, and Es refers to the Young's modulus of the glass substrate 11.

σ/Es is calculated from Formula (5), which is a modification of the Stoney's Formula (4). The Stoney's Formula is an equation for calculation of the stress of a thin film on a substrate from the amount of the warpage. Although the UV curable resin for the lenticular lens sheet 10 was not a thin film, the Stoney's Formula can be applied without significant problems. Although the lenticular lens sheet 10 is not round, the Stoney's Formula can be applied without significant problems, because the lenticular lens sheet 10 that is assessed for the amount of warpage has a dimension of 100 mm×100 mm or less and thus is considered as having a round shape.

$$\sigma = Es \times T^2/(6(1-v) \times R \times RT\text{max}) \qquad \text{Formula (4)}$$

$$\sigma/Es = T^2/(6(1-v) \times R \times RT\text{max}) \qquad \text{Formula (5)}$$

Figure 11:
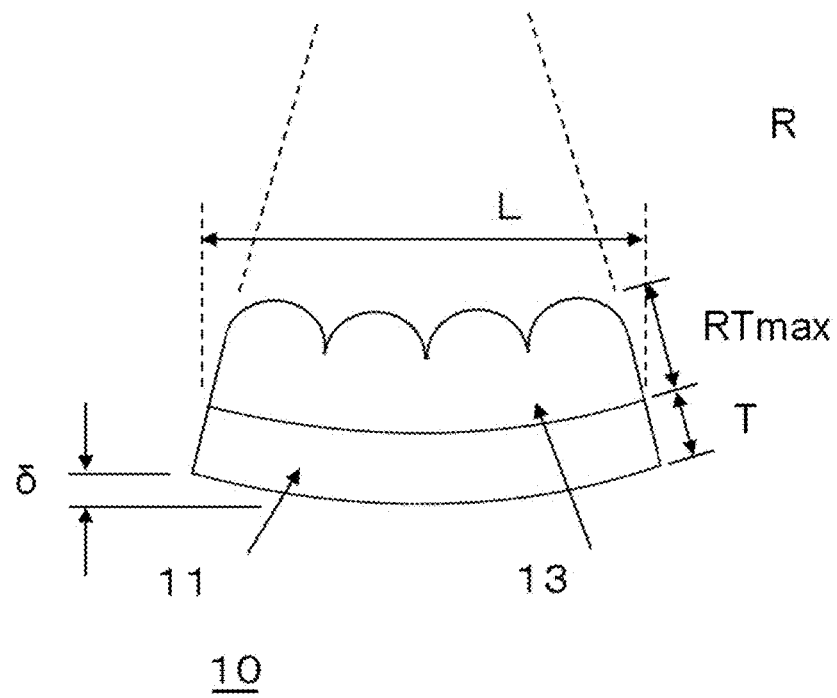
FIG. 11 is a cross-sectional view illustrating the definitions of the shape and the size of a warped lenticular lens.

T is the thickness of the glass substrate as defined above, v is the Poisson's ratio of the glass substrate, R is the radius of curvature of the lenticular lens sheet 10 (R differs from the radius of curvature of the lens array (r)), and RTmax is a resin thickness at the thickest regions as defined above. The Poisson's ratio can be defined as physical property of a glass substrate. The radius of curvature (R) is the difference of the radius of curvature before and after molding the resin. The radius of curvature (R) can be determined by directly measuring a lens sheet by laser scanning and fitting the measure to a circular arc. The radius of curvature (R) can also be calculated from the amount of warpage of the substrate. FIG. 11 illustrates a lenticular lens sheet 10 that exhibits a warpage (δ) after molding the UV curable resin. The warpage (δ) can be determined by directing a laser beam at the side of the glass substrate using, for example, a laser displacement meter. The measuring length (L) is a length for measuring the warpage. If the area for measuring the warpage has a square shape, L is the length of a side of the square. Next, Formula (6) is used to calculate the radius of curvature (R) from δ and L.

$$R = (\delta^2 + (L/2)^2)/2\delta \qquad \text{Formula (6)}$$

Generally, as the warpage of the lenticular lens sheet 10 increases, the radius of curvature (R) tends to become easily fitted (in the case, R decreases). It has been confirmed that even when the warpage of the sheet is small, the radius of curvature (R) can be fitted to some extent (in the case, R increases).

As seen from Formula (6), as warpage (δ) increases, the radius of curvature (R) decreases, and δ/Es in Formula (5) increases. Thus, when T, v, and RTmax remain constant, a smaller value of warpage indicates a smaller value of internal stress.

Table 1 illustrates pencil hardness and σ/Es×RTmax/T immediately after producing the lenticular lens sheet 10 with regard to a resin A and a resin B. In Table 1, the same lens mold is used to produce the respective lens sheets. And the maximum warpage (δmax) exhibited in assessment of the reliability of these lenticular lens sheets (a constant temperature test and a constant temperature and humidity test) is used to compare σ/Es×RTmax/T after the reliability assessment. With regard to both of the resin A and the resin B, the lens sheets for measuring σ/Es×RTmax/T have an RTmax of about 60 μm and include a glass substrate that is made of a same material and that has a same thickness. In the reliability assessment, the maximum amount of warpage (δmax) of the lenticular lens sheets 10 is a saturated value. In Table 1, the initial warpage is assessed as "good" (no problems) when the lenticular lens sheets 10 have no problems with the initial warpage and can be attached to a display device or as "poor" (problematic) when the lenticular lens sheets 10 have a problem. The warpage after the reliability assessment, which indicates the result of a thermal cycle test of a display device to which the respective lens sheets are attached, is assessed as "good" or "poor" in the similar manner. In Table 1, Δr represents the rate of change of the radius of curvature. With regard to both of the resin A and the resin B, Δr after the constant temperature test and the constant temperature and humidity test is in a range of from 2% to 3% regardless of the resin thickness at the thickest regions (RTmax). Thus, the resin B is curing during the constant temperature test and the constant temperature and humidity test, while the resin A is curing during the light fastness test, as well as during the constant temperature test and the constant temperature and humidity test, as described above.

a resin thickness ratio according to the present invention exhibits a large change in its radius of curvature.

As illustrated in Table 1, both of the resin A and the resin B exhibit a rate of change of the radius of curvature (Δr) of from 2% to 3% in the constant temperature test and the constant temperature and humidity test. However, the σ/Es× RTmax/T after the reliability assessment of the resin A does not substantially change from the initial σ/Es×RTmax/T in the constant temperature test and the constant temperature and humidity test, while the σ/Es×RTmax/T after the reliability assessment of the resin B is three times or more than the initial σ/Es×RTmax/T in the constant temperature test

TABLE 1

| | | Constant Temperature Test and Constant Temperature and Humidity Test | | | | | |
|---|---|---|---|---|---|---|---|
| | | σ/Es × RTmax/T (ppm) | | Warpage | | | Light |
| Resin | Pencil Hardness | Initial | After Reliability Assessment | Initial | After Reliability Assessment | Δr | Fastness Test Rtmax-Δr Curve |
| A | 6B | 2.6 | 2.6 | Good | Good | 2-3% | A type |
| B | H | 13.0 | 43.4 | Poor | Poor | 2-3% | B type |

In Table 1, the resin A has very soft pencil hardness of 6B, while the resin B has pencil hardness of H. Table 1 shows that the resin B has an initial σ/Es×RTmax/T of 13.0 ppm and a σ/Es×RTmax/T after the reliability assessment of 43.4 ppm, which is significantly increased. The lenticular lens sheet that includes the resin B has a large initial warpage and is difficult to attach to a display device. A lens sheet that includes the resin B and that is then attached to a display device has a low yield and peeled off of the display device in the thermal cycle test. On the other hand, the σ/Es× RTmax/T of the resin A after the reliability assessment does not change from the initial σ/Es×RTmax/T, which are 2.6 ppm. A lenticular lens sheet 10 that includes the resin A in the initial state can be attached to a display device without problems and has no problems in the thermal cycle test.

With regard to a relationship between σ/Es×RTmax/T and failure due to the warpage, Table 1 shows that a problem does not arise when σ/Es×RTmax/T is equal to or less than 3.0 ppm, while a problem arises when σ/Es×RTmax/T is equal to or more than 13.0 ppm. 3.0 ppm is a value obtained by introducing an error of 15% into 2.6 ppm. Thus, the UV curable resin 13 preferably has a σ/Es×RTmax/T of less than 13.0 ppm. More preferably, the UV curable resin 13 has a σ/Es×RTmax/T of 3.0 ppm or less.

Figure 1:
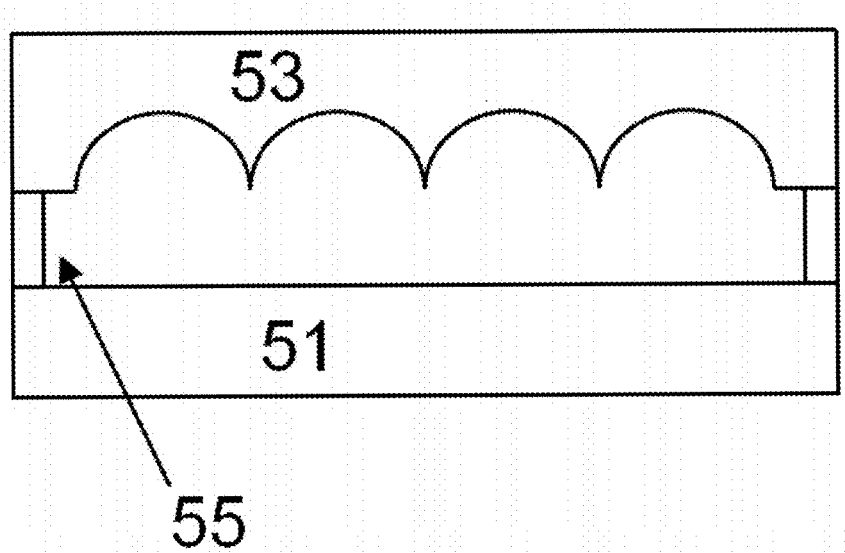
FIG. 1 is a cross-sectional view illustrating part of a process for producing a lenticular lens sheet described in Patent Document 1.
Figure 2:
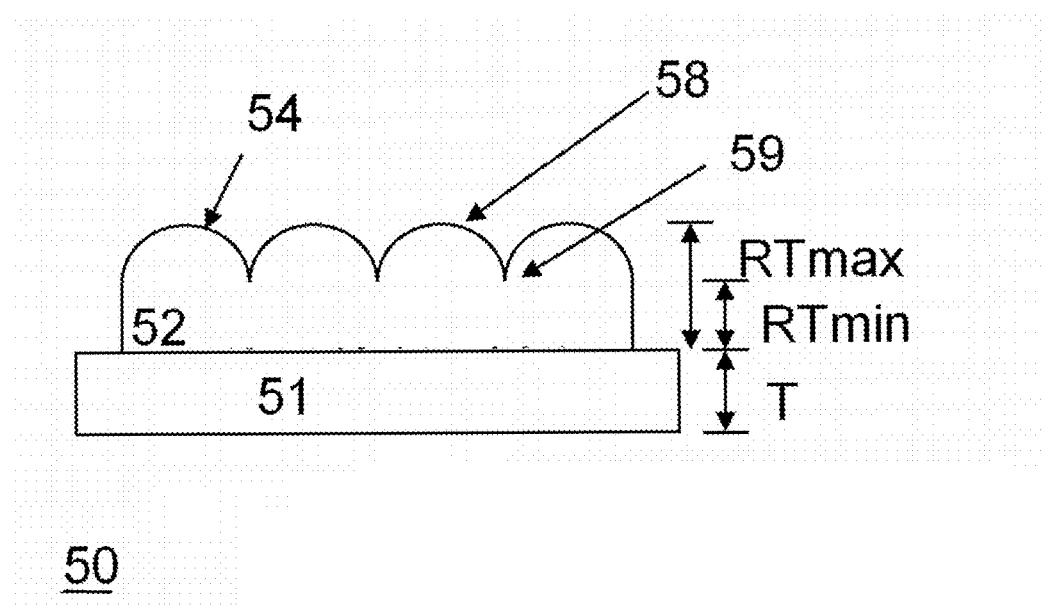
FIG. 2 is a cross-sectional view of a lenticular lens sheet described in Patent Document 1.
Figure 3:
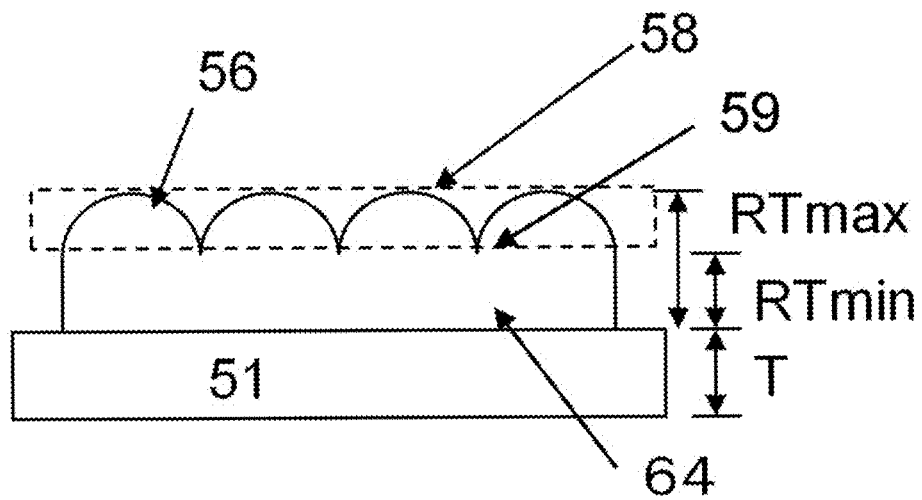
FIG. 3 is a cross-sectional view illustrating the definitions of a lens array according to the present invention.
Figure 4:
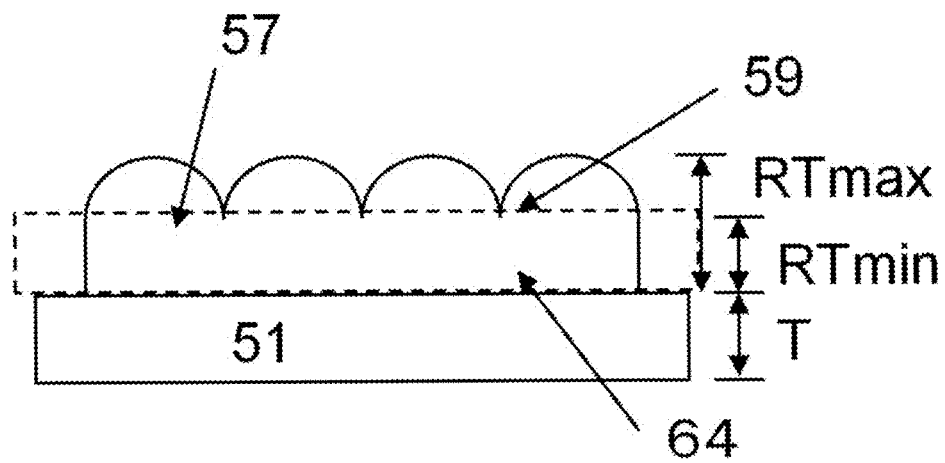
FIG. 4 is a cross-sectional view illustrating the definitions of a base according to the present invention.
Figure 5:
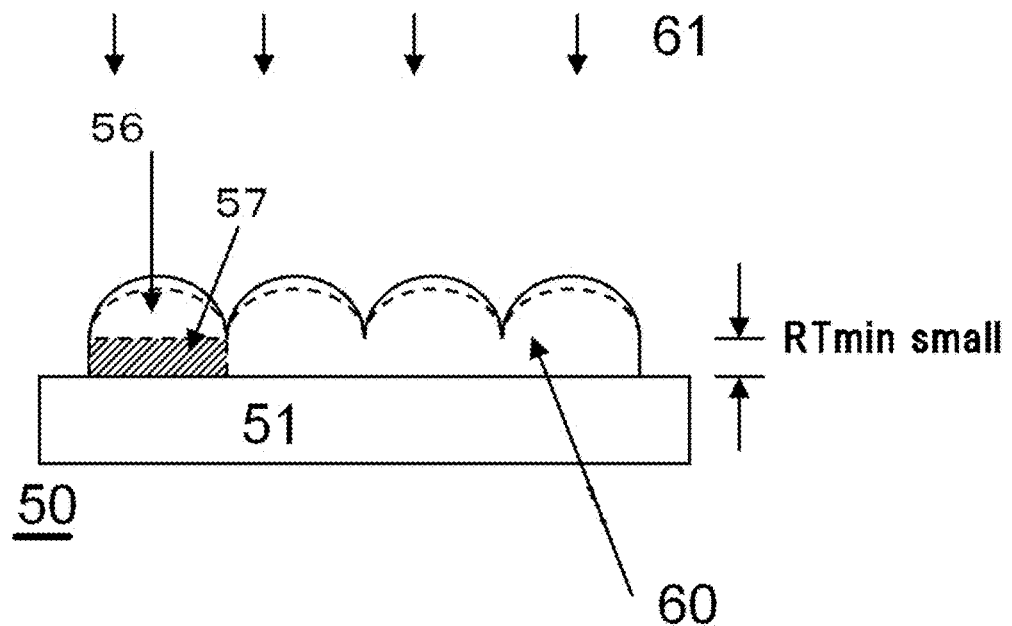
FIG. 5 is a cross-sectional view illustrating a phenomenon exhibited by a lenticular lens sheet in a light fastness test.
Figure 6:
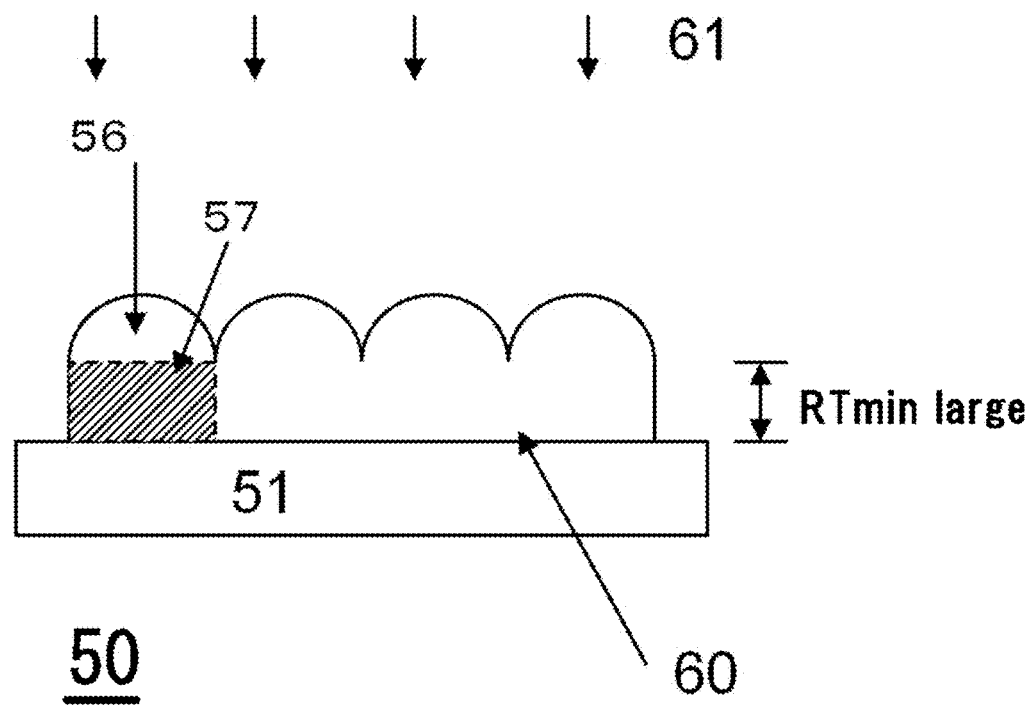
FIG. 6 is a cross-sectional view illustrating a phenomenon exhibited by a lenticular lens sheet according to the present invention in a light fastness test.

While the resin B does not substantially cure in the light fastness test, the resin B cures and exhibits a slight change in its radius of curvature in the constant temperature test and the constant temperature and humidity test. The resin A cures and exhibits a slight change in its radius of curvature in the constant temperature test and the constant temperature and humidity test, and also cures in the light fastness test. In the constant temperature test and the constant temperature and humidity test, the UV curable resins have a substantially uniform temperature and thus uniformly cures, which results in a change in the radius of curvature of from 2% to 3%, regardless of the resin thickness at the thickest regions. In the light fastness test, cure of the UV curable resins is advanced from the side that is irradiated with light, as illustrate in FIGS. 5 and 6, and thus a resin that does not have and the constant temperature and humidity test. With regard to both of the resin A and the resin B, the lens sheets for measuring σ/Es×RTmax/T illustrated in Table 1 have an RTmax of about 60 μm and include a glass substrate that is made of a same material and that has a same thickness, as described above. Thus, the difference in modulus between the resin A and the resin B greatly affects the difference in σ/Es×RTmax/T. Unlike metal, high hardness resins generally have a high elastic modulus. Thus, the resin A that has pencil hardness of 6B has a lower elastic modulus, compared with the resin B that has pencil hardness of H. As the resin A and the resin B is curing in the constant temperature test and the constant temperature and humidity test, the lens array shrinks, and the radius of curvature slightly increases. As the resin A has a low elastic modulus, curing shrinkage of the resin A is compensated by deformation of the resin A itself, and thus the lens sheet that is made of the resin A does not exhibit a change in warpage. On the other hand, as the resin B has a high elastic modulus, curing shrinkage of the resin B is not substantially compensated by deformation of the resin B itself, and thus the lens sheet exhibits a large warpage. The low elastic modulus of the resin A may readily cause a change in the density of the photocurable resin to maintain the volume of the resin, as illustrated in FIG. 6. Use of a resin that exhibits a small σ/Es×RTmax/T can reduce warpage of the lens sheet after the constant temperature test and the constant temperature and humidity test and can reduce a change in the radius of curvature in the light fastness test.

In a case in which the lenticular lens sheet 10 includes the glass substrate 11, and in which there is the problem of warpage of the lenticular lens sheet after molding the UV curable resin 13, it is generally attempted to reduce the thickness of the UV curable resin 13 and not the thickness of the glass substrate 11. The glass substrate 11 has a small coefficient of linear expansion and does not substantially change its size when the substrate is exposed to heat while molding the UV curable resin 13. On the other hand, the UV curable resin 13 exhibits curing shrinkage when the resin 13 is molded, and the resin 13 increases ten-fold in size, compared with the glass substrate, when the resin 13 is exposed to heat. Thus, it is generally attempted to reduce the thickness of the UV curable resin, which exhibits larger curing shrinkage and larger thermal expansion, to prevent the warpage.

When the thickness of the UV curable resin 13 is reduced, a change in the shape of the lens array affects the optical properties. Thus, it is generally attempted to reduce the thickness of the base (RTmin) to 0, the base not affecting the optical properties. In the present invention, instead of simply reducing RTmin to 0, thickness of the major patterned component (RTmax−RTmin) is set as described above to ensure the light fastness, and RTmin necessary to achieve the effect of the present invention is determined using Formula (1) or Formula (2).

Although the first embodiment has been described with regard to a lenticular lens sheet, it should be appreciated that the embodiment is not limited to a lenticular lens sheet, and that the embodiment is also applicable to other optical elements that can be produced by patterning a photocurable resin on a substrate according to the embodiment. Examples of the other optical elements include fly-eye lens sheets and Fresnel lens sheets. The major patterned component of fly-eye lens sheets is a lens array. The major patterned component of Fresnel lens sheets is a pattern that constitutes the Fresnel lenses.

Although the first embodiment has been described with regard to the UV curable resin 13, it should be appreciated that a visible-light curable resin is applicable to the optical element according to the embodiment. Although the embodiment is not limited to a photocurable resin, it should be appreciated that any resin is applicable to the optical element according to the embodiment as long as the resin exhibits curing shrinkage due to the action and the effect of the present invention, when the resin is patterned and exposed to light.

Although the first embodiment has been described with regard to the glass substrate 11, it should be appreciated that a resin substrate is applicable to the optical element that can be produced by patterning a resin on a substrate according to the embodiment. In a case in which a resin substrate is used, the effects of preventing curvature change in a light fastness test and of preventing warpage can be provided. However, a resin substrate that has a certain thermal expansion coefficient may cause a problem of misalignment due to the difference in thermal expansion coefficient between a lens sheet made of the resin and a display device, as described in "TECHNICAL FIELD". In a case in which a resin substrate has a thermal expansion coefficient similar to that of a glass substrate, the resultant lens sheet does not cause a problem of thermal misalignment.

In a case in which the resin thickness at the thickest regions (RTmax) of a lens sheet significantly varies with the position of the optical element, it is preferred to divide the area and to apply the embodiment to each of the divided parts.

Second Embodiment

While the optical element according to the first embodiment addresses a problem of deformation of a resin that constitutes the element in a light fastness test, the optical element according to the second embodiment addresses a problems of warpage of a resin that constitutes the element.

Figure 15:
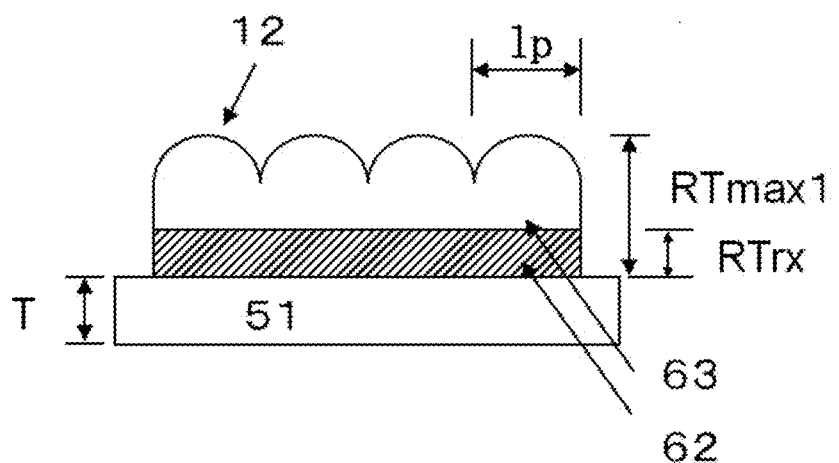
FIG. 15 is a cross-sectional view of a lenticular lens sheet according to the second embodiment of the present invention.

The second embodiment will be described with reference to FIGS. 15-20. As illustrated in FIG. 15, an optical element according to the second embodiment is produced by forming a stress-release resin layer 62 on a substrate 51 and then forming a patterned resin layer 63 on the stress-release resin layer 62 to produce curved pieces (lenses).

Figure 20:
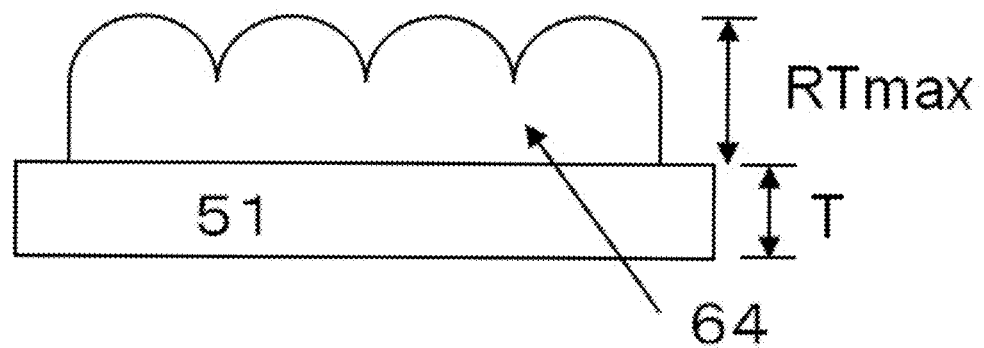
FIG. 20 is a cross-sectional view of a lenticular lens sheet of a comparative example.

In an optical element that includes a substrate 51 and a resin 64 as illustrated in FIG. 20, use of a resin that exhibits large warpage such as a resin B as the resin 64 causes the problem that the resultant element exhibits large warpage in the initial state and after reliability assessment. On the other hand, use of a resin such as a resin A as the resin 64 causes the problem that the resultant element exhibits large deformation if the element does not have a configuration according to the first embodiment, although the element exhibits small warpage.

Figure 17:
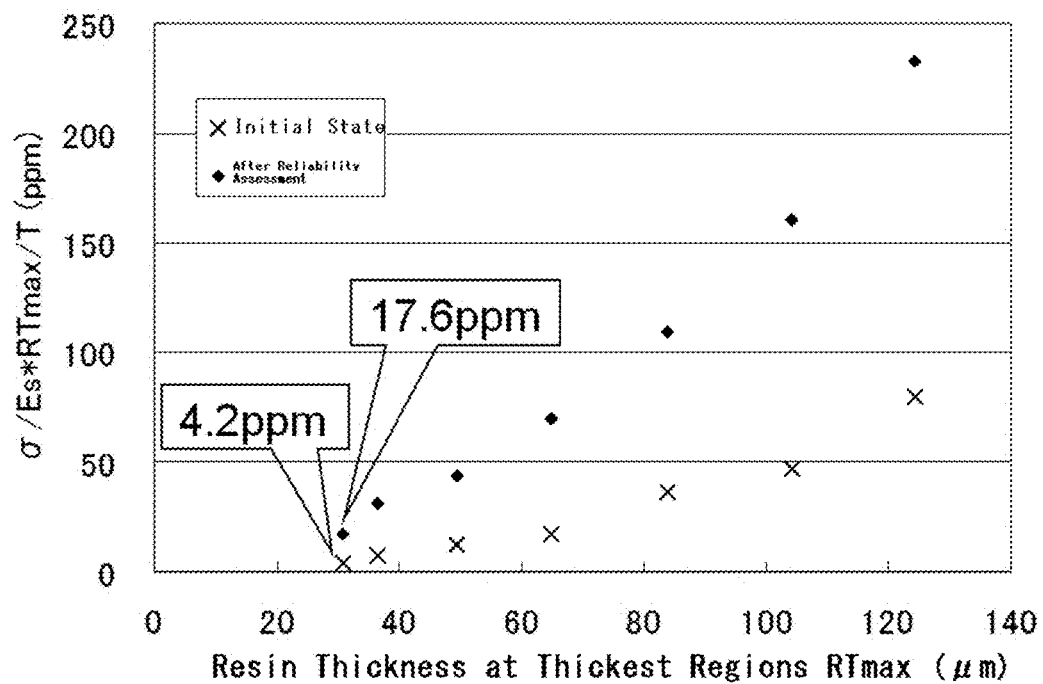
FIG. 17 is a graph illustrating a relationship between a resin thickness at the thickest regions (RTmax) and σ/Es× RTmax/T of a lenticular lens sheet that includes a resin B in the initial state and after reliability assessment (a constant temperature test and a constant temperature and humidity test). (RTmax−RTmin is maintained at a constant value of about 21 μm.)

FIG. 17 is a graph illustrating a relationship between a resin thickness at the thickest regions (RTmax) and σ/Es× RTmax/T of an optical element that includes a resin B in the initial state and after reliability assessment (a constant temperature test and a constant temperature and humidity test). RTmax−RTmin is maintained at about 21 μm. The substrate 51 is a glass substrate. FIG. 17 shows that the optical element that includes the resin B increases σ/Es× RTmax/T, as a resin thickness at the thickest regions (RTmax) increases, both in the initial state and after reliability assessment. Due to curing shrinkage, σ/Es×RTmax/T after reliability assessment is larger than σ/Es×RTmax/T in the initial state. When RTmax is 30 μm, σ/Es×RTmax/T in the initial state and after reliability assessment are respectively 4.2 ppm and 17.6 ppm.

Figure 16:
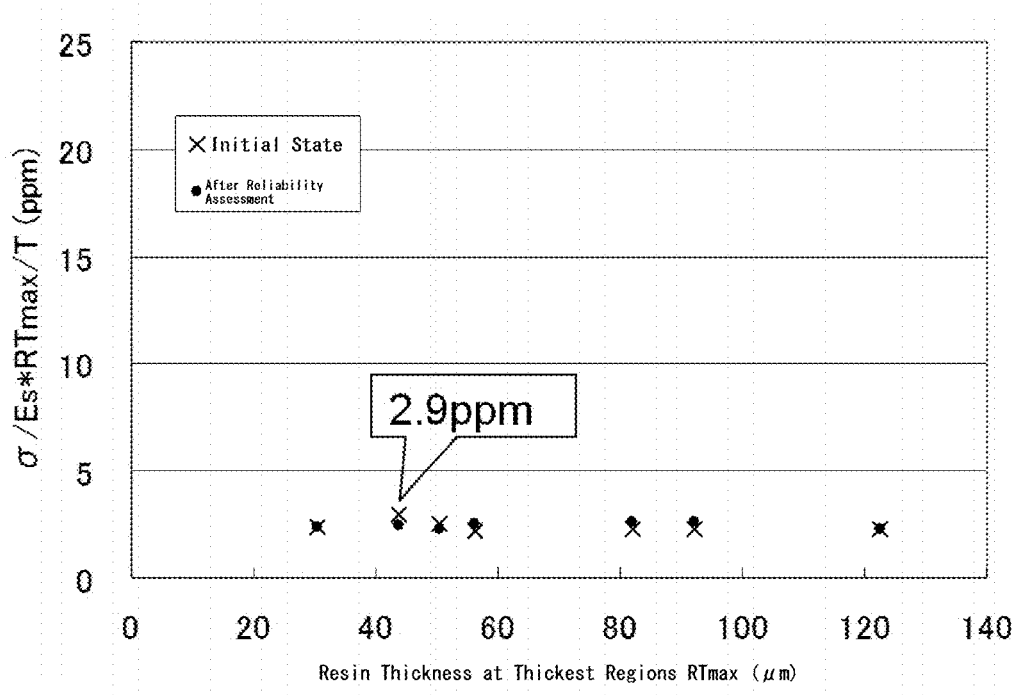
FIG. 16 is a graph illustrating a relationship between a resin thickness at the thickest regions (RTmax) and σ/Es× RTmax/T of a lenticular lens sheet that includes a resin A in the initial state and after reliability assessment (a constant temperature test and a constant temperature and humidity test). (RTmax−RTmin is maintained at a constant value of about 21 μm.)

FIG. 16 is a graph illustrating a relationship between a resin thickness at the thickest regions (RTmax) and σ/Es× RTmax/T of an optical element that includes a resin A in the initial state and after reliability assessment (a constant temperature test and a constant temperature and humidity test). RTmax−RTmin is maintained at about 21 μm. The substrate 51 is a glass substrate. FIG. 16 shows that the optical element that includes the resin A has a σ/Es× RTmax/T of 2.9 ppm or less, regardless of a resin thickness at the thickest regions (RTmax), both in the initial state and after reliability assessment.

In the second embodiment, a resin B that does not exhibit deformation in a light fastness test but exhibits large warpage is used for the patterned resin layer 63 illustrated in FIG. 15, and a soft resin A that exhibits small warpage is used for the stress-release resin layer 62. The thickness of the substrate 51 is designated as T. The thickness of the stress-release resin layer 62 is designated as RTrx. The total thickness of the stress-release resin layer 62 and the patterned resin layer 63 is designated as RTmax1.

Next, the lenticular lens sheet 18 is used to consider the conditions for preventing warpage, which is a problem of the resin B. The assessment is performed by fixing a thickness of the resin B, i.e., RTmax1−RTrx, which is the thickness of the patterned resin layer, at about 30 μm, varying RTmax1 (thus also varying RTrx), and determining σ1/Es×RTmax1/T after a constant temperature test and after a constant temperature and humidity test. σ1 is the internal stress of a resin laminate layers that is constituted by the patterned resin layer 63 and the stress-release resin layer 62. σ1/Es is determined by the method described in the first embodiment. The distance from a lens valley to a lens peak is about 21 μm. The substrate 51 is a glass substrate that has a thickness of from 100 μm to 300 μm. The lens 12 has a pitch of from 100 μm to 500 μm.

Figure 18:
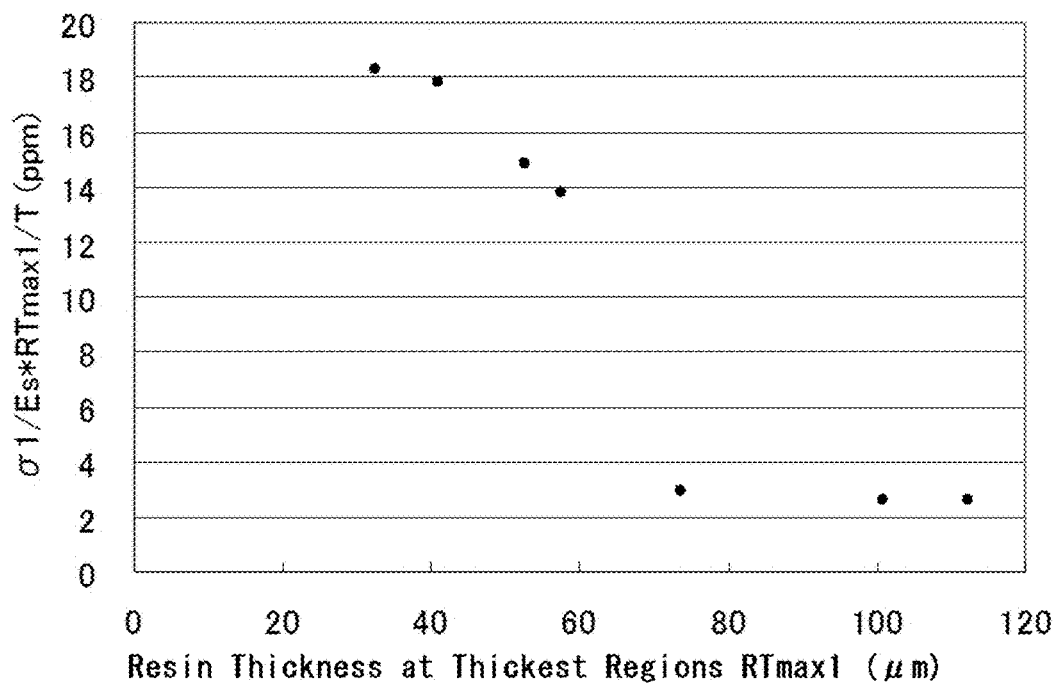
FIG. 18 is a graph illustrating a relationship between a resin thickness at the thickest regions (RTmax1) and σ1/Es× RTmax1/T of a lenticular lens sheet that includes resin laminate layers that include a stress-release resin layer made of a resin B and a patterned resin layer made of a resin A after reliability assessment (a constant temperature test and a constant temperature and humidity test). (RTmax1−RTrx is maintained at a constant value of about 30 μm.)

The result of the assessment is illustrated in FIG. 18 as a graph illustrating a relationship between a resin thickness at the thickest regions (RTmax1) and σ1/Es×RTmax1/T. FIG. 18 shows a very high correlation between RTmax1 and σ1/Es×RTmax1/T, as in FIG. 8 according to the first embodiment. Maintenance of RTmax at 73 µm or more allows maintenance of σ1/Es×RTmax1/T at 3.0 ppm or less.

Figure 19:
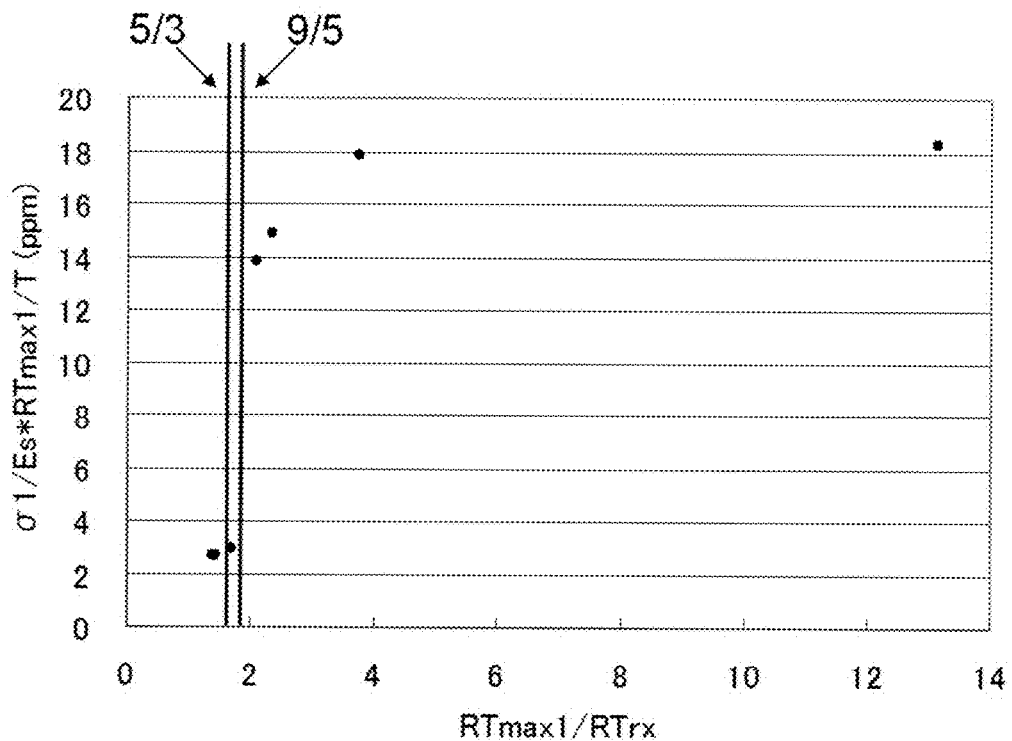
FIG. 19 is a graph illustrating a relationship between a resin thickness at the thickest regions (RTmax1) and σ1/Es× RTmax1/T of a lenticular lens sheet that includes resin laminate layers that include a stress-release resin layer made of a resin B and a patterned resin layer made of a resin A after reliability assessment (a constant temperature test and a constant temperature and humidity test). (RTmax1−RTrx is maintained at a constant value of about 30 μm.)

To generalize the result illustrated in FIG. 18, a graph illustrating a relationship between RTmax1/RTrx and σ1/Es×RTmax1/T is illustrated in FIG. 19. FIG. 19 shows that when RTmax1/RTrx is equal to or less than 9/5, σ1/Es×RTmax1/T can be maintained at 13.0 ppm or less after the constant temperature test and after the humidity constant temperature test, as in FIG. 9 according to the first embodiment. Additionally, when RTmax1/RTrx is equal to or less than 5/3, σ1/Es×RTmax1/T can be maintained at 3.0 ppm or less. The assessment is performed under the condition of RTmax1<T.

The warpage problem do not arise when σ1/Es×RTmax1/T is equal to or less than 3.0 ppm, while the warpage problem arises when σ1/Es×RTmax1/T is equal to or more than 13.0 ppm, as in the first embodiment.

In the second embodiment, only the warpage is described, although no problems are detected with regard to other properties such as the transmittance and the appearance.

In the second embodiment, use of a soft resin that has pencil hardness of 6B or softer can reduce warpage of the lens sheet after a constant temperature test and a constant temperature and humidity test and can reduce a change in the radius of curvature in a light fastness test, as in the first embodiment.

Although both of the patterned resin layer 63 and the stress-release resin layer 62 are a resin monolayer in the second embodiment, either or both of the layers may be a resin multilayer, which complicates the process.

Third Embodiment

An optical element according to the third embodiment differs from the optical elements according to the first and the second embodiments, in that the element is combined with a display panel such as a liquid crystal display, an organic EL (electroluminescent) display panel, and a PDP (plasma display panel) to form a stereoscopic display device.

Figure 12:
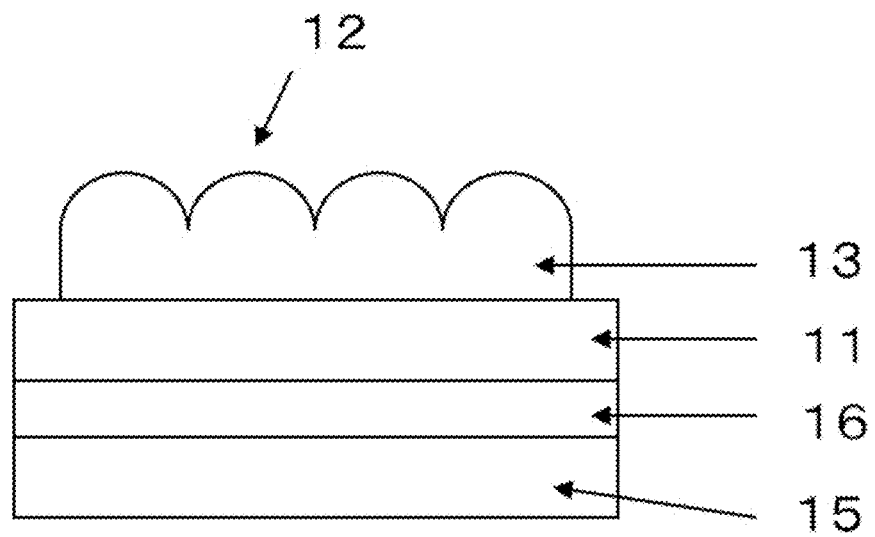
FIG. 12 is a cross-sectional view of a stereoscopic display device that includes a lenticular lens sheet according to the third embodiment of the present invention, the sheet being attached to a display panel.

As illustrated in FIG. 12, a lens sheet such as a lenticular lens sheet 10 is attached via an adhesive 16 to a display panel 15. The adhesive 16 is a liquid adhesive or a film adhesive. A lens 12 is disposed such that each of the lenses is placed above at least a pair of right and light side pixels (two rows). In this way, a stereoscopic display device 21 that can display 3D images is completed. The stereoscopic display device 21 according to the third embodiment includes a lens sheet according to the first embodiment. The stereoscopic display device 21 according to the third embodiment may also include a lens sheet according to the second embodiment.

Figure 14:
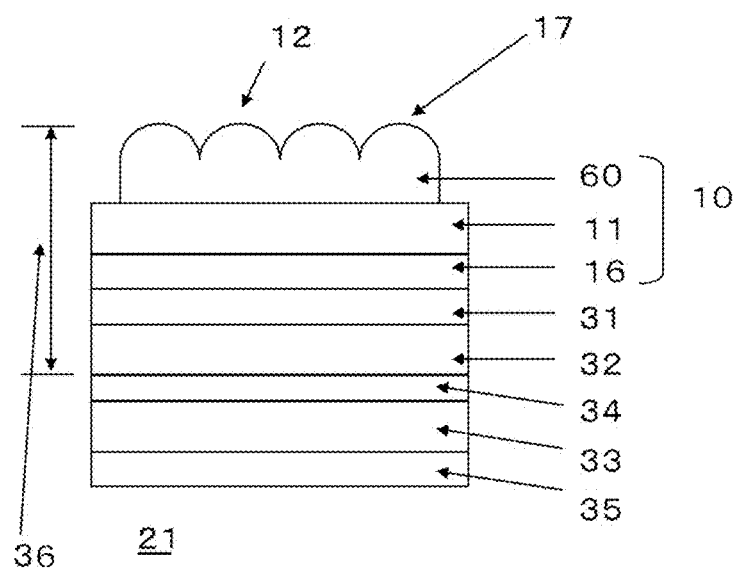
FIG. 14 is a cross-sectional view of a stereoscopic display device that includes a lenticular lens sheet according to the third embodiment of the present invention, the sheet being attached to a liquid crystal display panel.

In the stereoscopic display device illustrated in FIG. 12, the distance between the lens sheet such as the lenticular lens sheet 10 and the pixels of the display panel 15 (referred to as "lens-pixel distance") is important for displaying 3D images. The lens-pixel distance depends on the lens pitch (lp), the pixel pitch, the distance from which 3D images are most readily viewed (optimum 3D viewing distance), and the number of viewpoints. The number of viewpoints refers to the number of different viewpoint images projected into a space for displaying 3D images. For example, in a case in which each of the lenses is placed above a pair of right side pixel and a left side pixel, an image are projected individually for the right side viewpoint and the left side viewpoint, i.e., two viewpoints. For example, in a case in which each of the lenses is placed above two pairs of pixels, the number of viewpoints is 4. The number of viewpoints can be varied depending on the relationship between pixels and lenses. When the optimum 3D viewing distance and the number of viewpoints remain constant, the pixel pitch is proportional to the lens-pixel distance. Thus, as the pixel pitch decreases, it is necessary to reduce the lens-pixel distance. In recent years, display panels tend to provide images of increasingly higher resolution and to have a smaller lens-pixel distance. To describe the lens-pixel distance in detail, FIG. 14 illustrates an exemplary cross-section of a stereoscopic display device that uses a liquid crystal. In the case of a liquid crystal display device, the lens-pixel distance 36 is defined as the distance from a lens peak 17 to the liquid crystal layer 34. It is necessary to reduce the thickness of the photocurable resin 60, the thickness of the glass substrate 11, the thickness of the adhesive 16, the thickness of the polarizing plate 31, and the thickness of the color filter substrate 32 to reduce the lens-pixel distance 36. Reduction of the thickness of the adhesive 16, the thickness of the polarizing plate 31, and the thickness of the color filter substrate 32 without increasing cost is limited, and thus it is also necessary to reduce the thickness of the lenticular lens sheet 10.

Use of the glass substrate 11 as a substrate of the lenticular lens sheet 10 provides technical and cost problems for achieving a thin display. In particular, a glass substrate that has a thickness of 200 µm can be cut with a relatively cheap glass scriber with a roll cutter, while a glass substrate that has a thickness of 100 µm is difficult to cut with a scriber and has a significantly reduced yield.

Figure 21:
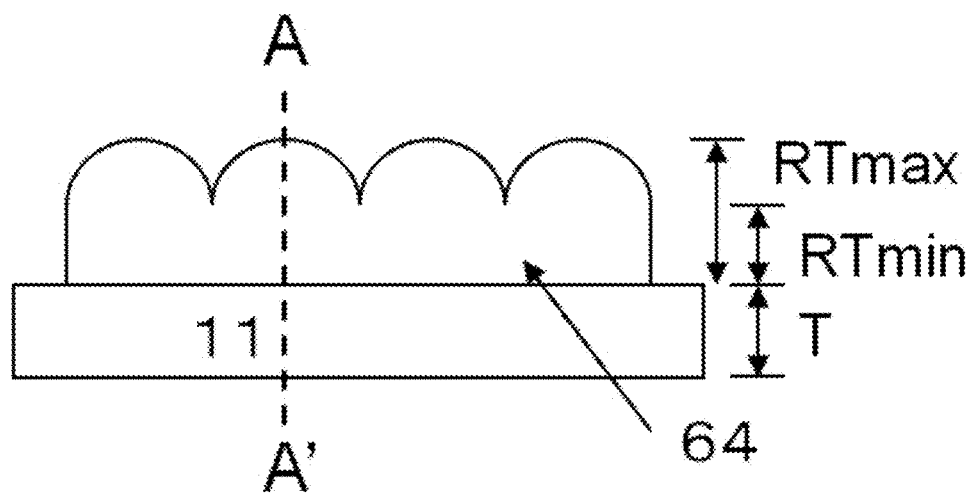
FIG. 21 is a cross-sectional view illustrating cutting of a lenticular lens sheet.

A method of molding plural lens using a single lens mold (single-mold method) is used to reduce costs. In this case, it is necessary to be able to section the resultant sheet to obtain a cross-section that includes the resin 64, such as the cross-section taken along the line A-A' in FIG. 21. Thus, it is also necessary to cut the resin 64, together with the glass substrate 11. In a case in which a lens sheet includes a glass substrate that has a thickness of 200 µm and has an RTmax of about 100 µm, the glass substrate and the resin 64 can be cut together with a scriber without any additional operation.

In a case in which a lens sheet includes a glass substrate that has a thickness of 100 µm, it is difficult to cut the glass substrate and the resin 64 together. Even if the glass substrate and the resin 64 are tried to be cut together, the resin 64 cannot be cut together with the substrate, which induces fracture of the glass in an area away from the scribe lines. Thus, the glass substrate preferably has a thickness of 200 µm or more.

In a case in which the substrate is a commonly-used resin substrate, both of a resin substrate that has a thickness of 200 µm and a resin substrate that has a thickness of 100 µm can be punched out with a Thomson blade. Unlike a commonly-used resin substrate, a glass substrate that has a smaller thickness has a more severe handleability problem such as ease of fracture due to impact. At present, there are no resin substrates that are as cost effective as glass substrates and that have a thermal expansion coefficient similar to that of glass substrates. Glass substrates are very useful for maintaining the good positional relationship between lenses and pixels with respect to temperature.

However, thinning of the glass substrate 11 is limited, and thus it is very important to reduce the thickness of the photocurable resin 60 as far as possible, as described above. In the present invention, to ensure light fastness, the thickness of a major patterned component (RTmax−RTmin) is set as described above, and a resin thickness at the thickest regions (RTmax or RTmax1) that is necessary to achieve the effect of the present invention and that is the thinnest is determined using Formula (1) or Formula (2).

Display panels provide images of increasingly higher resolution in recent years, and thus a resin thickness at the thickest regions (RTmax or RTmax1) is preferably 100 μm or less.

Figure 13A:
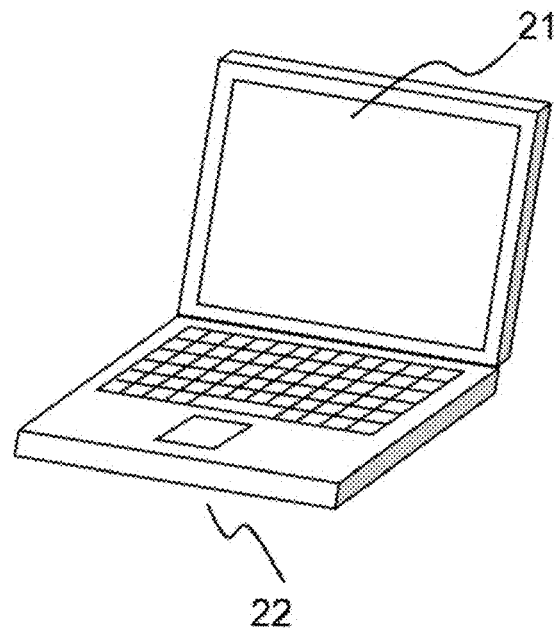
FIG. 13A is a perspective view of the first example of an electronic apparatus to which a stereoscopic display device according to the third embodiment is applicable.
Figure 13B:
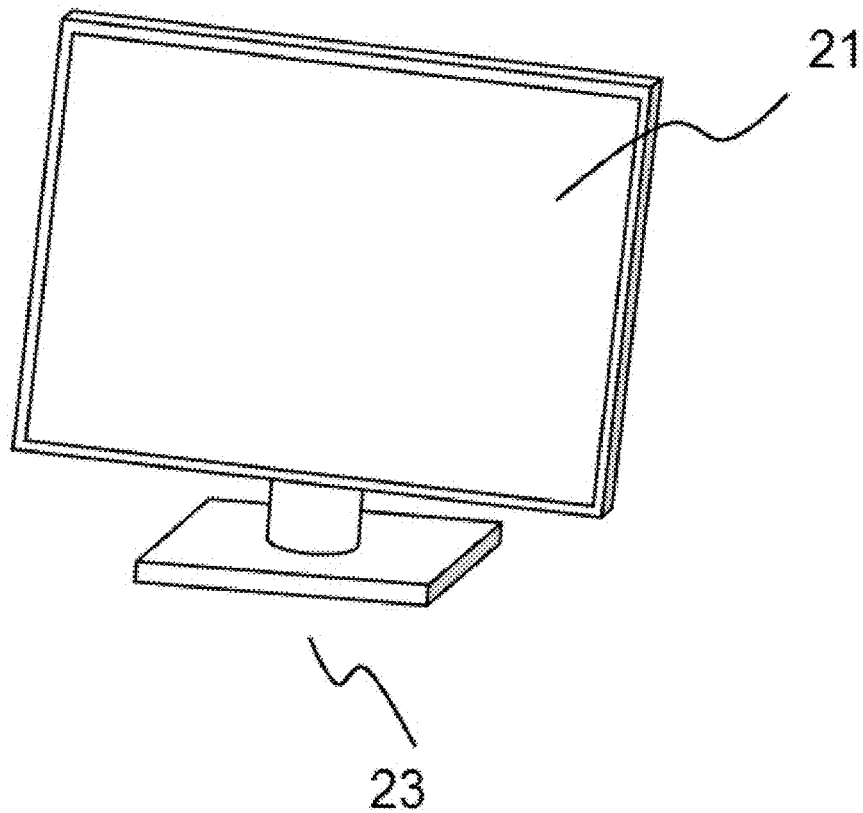
FIG. 13B is a perspective view of the second example of an electronic apparatus to which a stereoscopic display device according to the third embodiment is applicable.
Figure 13C:
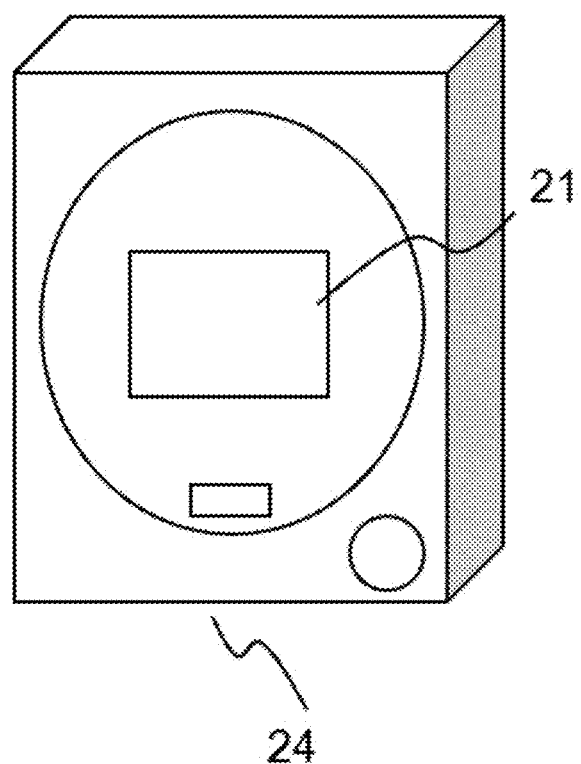
FIG. 13C is a perspective view of the third example of an electronic apparatus to which a stereoscopic display device according to the third embodiment is applicable.

FIGS. 13A-C are respectively a perspective view of the first, the second, and the third examples of an electronic apparatus to which a stereoscopic display device according to the third embodiment is applicable.

FIGS. 13A-C illustrates an electronic apparatus to which a stereoscopic display device 21 according to the third embodiment is applicable. As examples of the electronic apparatuses, a personal computer 22 (FIG. 13A), a television set 23 (FIG. 13B), and a pachinko machine 24 (FIG. 13C) are illustrated, although the stereoscopic display device 21 according to the third embodiment is applicable to various electronic apparatuses such as cellular phones, smartphones, PDA, game consoles, digital cameras, digital video cameras, display screens of car navigation systems, and in-car display screens. Use of the lenticular lens sheet 10 according to the first embodiment can prevent a change in the radius of curvature of the lens 12 after a light fastness test. The warpage can be also prevented in production and use of a display device, which facilitates the production and eliminates peeling of the sheet. Thus, the reliability is improved, and the costs are reduced.

According to the embodiments described above, an electronic apparatus that has excellent visual properties and superior viewing quality and that can provide different images on different viewpoints can be provided at low cost.

DESCRIPTION OF THE REFERENCE NUMERAL 10, 18 lenticular lens sheet
11 glass substrate
12 lens
13 UV curable resin
15 display panel
16 adhesive
17 lens peak
21 stereoscopic display device
22 personal computer
23 television set
24 pachinko machine
31 polarizing plate
32 color filter substrate
33 TFT substrate
34 liquid crystal layer
35 polarizing plate
36 lens-pixel distance
50 lenticular lens sheet
51 substrate
52 UV curable resin
53 lens mold
54 lens
55 protrusion
56 lens array
57 base
58 lens peak
59 lens valley
60 photocurable resin
61 light
62 stress-release resin layer
63 patterned resin layer
64 resin

The invention claimed is:

1. An optical element comprising a substrate and a resin and satisfies the following formula:

$$RT\max/RT\min \leq 9/5 \qquad \text{Formula (1)}$$

wherein RTmin represents the resin thickness at the thinnest regions of a major patterned component that is made of the resin, and RTmax represents the resin thickness at the thickest regions of the major patterned component which is made of the resin, and wherein the optical element satisfies the following formula:

$$\sigma/Es \times RT\max/T < 13.0 \text{ ppm} \qquad \text{Formula (3a)}$$

wherein σ represents the internal stress of the resin, Es represents the Young's modulus of the substrate, and T represents the thickness of the substrate.

2. The optical element according to claim 1, wherein the optical element satisfies the following formula:

$$\sigma/Es \times RT\max/T \leq 3.0 \text{ ppm} \qquad \text{Formula (3b)}$$

3. The optical element according to claim 1, wherein the substrate is a glass substrate that has a thickness of 200 μm or more.

4. The optical element according to claim 1, wherein the optical element is a lenticular lens sheet, a fly-eye lens sheet, or a Fresnel lens sheet.

5. A display device that comprises the optical element according to claim 1.

6. An optical element comprising a substrate and a resin and satisfies the following formula:

$$RT\max/RT\min \leq 9/5 \qquad \text{Formula (1)}$$

wherein RTmin represents the resin thickness at the thinnest regions of a major patterned component that is made of the resin, and RTmax represents the resin thickness at the thickest regions of the major patterned component which is made of the resin, and wherein the resin has pencil hardness of 6B or softer.

7. An optical element that comprises a substrate and two or more resin laminate layers, wherein the resin laminate layers comprise a stress-release resin layer and a patterned resin layer, wherein the stress-release resin layer is disposed between the patterned resin layer and the substrate, wherein the patterned resin layer forms a major patterned component, and wherein the optical element satisfies the following formula:

$$RT\max1/RTrx \leq 9/5 \qquad \text{Formula (7)}$$

wherein RTrx represents the resin thickness of the stress-release resin layer, and RTmax1 represents the resin thickness at the thickest regions of the resin laminate layers, and wherein the optical element satisfies the following formula:

$$\sigma1/Es \times RT\max1/T < 13.0 \text{ ppm} \qquad \text{Formula (9)}$$

wherein σ1 represents the internal stress of the resin laminate layers, Es represents the Young's modulus of the substrate, and T represents the thickness of the substrate.

8. The optical element according to claim 7, wherein the optical element satisfies the following formula:

$$RT\max1/RTrx \leq 5/3 \qquad \text{Formula (8).}$$

9. The optical element according to claim 7, wherein the optical element satisfies the following formula:

$$\sigma1/Es \times RT\max1/T \leq 3.0 \text{ ppm} \qquad \text{Formula (10).}$$

10. The optical element according to claim 7, wherein the substrate is a glass substrate that has a thickness of 200 μm or more.

11. The optical element according to claim 7, wherein the stress-release resin layer has pencil hardness of 6B or softer.

12. The optical element according to claim 7, wherein the optical element is a lenticular lens sheet, a fly-eye lens sheet, or a Fresnel lens sheet.

13. A display device that comprises the optical element according to claim 7.

14. An optical element comprising a substrate and a resin and satisfies the following formula:

$$RTmax/RTmin \leq 9/5 \quad \text{Formula (1)}$$

wherein RTmin represents the resin thickness at the thinnest regions of a major patterned component that is made of the resin, and RTmax represents the resin thickness at the thickest regions of the major patterned component which is made of the resin, wherein the resin includes a lens portion having a predetermined curvature radius and a base portion of the lens portion, and wherein a change rate Δr of the curvature radius after a light fastness test is 10% or less.

15. The optical element according to claim 14, wherein the optical element satisfies the following formula:

$$RTmax/RTmin \leq 5/3 \quad \text{Formula (2), and}$$

wherein the change rate Δr of the curvature radius after the light fastness test is 5.5% or less.

* * * * *